Patented Sept. 7, 1943

2,329,147

UNITED STATES PATENT OFFICE 2,329,147

STABILIZED METAL SOL AND METHOD OF PREPARING SAME

Paul Troch, Erxleben, near Neuhaldensleben, Bezirk Madgeburg, Hermann Voss and Erich Rabald, Mannheim-Waldhof, and Heri Geigel, Mannheim-Feudenheim, Germany, assignors, by mesne assignments, to Rare Chemicals, Inc., New York, N. Y., a corporation of New York No Drawing. Application February 12, 1940, Serial No. 318,654. In Germany May 7, 1938

22 Claims. (Cl. 252—313)

The present invention relates to sols of heavy metals, especially to sols of precious metals, as of gold, silver and, preferably, of metals of the platinum group, as platinum, palladium, etc.

In accordance with the invention, water soluble dyestuffs or water soluble salts of same are used as stabilizers for metal sols, preferably water soluble salts of xanthone dyestuffs, as of pyronines, succineines and anthraoxyphthaleines, especially such of the fluorone group (or oxyfluorone group, as it is also called), e. g. fluoresceine, dinitrodibromofluoresceine (eosine bluish), tetrabromofluoresceine (eosine yellowish), tetrabromofluoresceine ethyl ester (eosine S), tetraiodofluoresceine (erythrosine), tetraiododichlorofluoresceine (rose bengal), diethylrhodamine fluoresceine ethyl ester (rhodamine 6G), tetrabromotetrachlorofluoresceine (phloxine), bisulphite compound of coeruleine (coeruleine S), etc. (As to the nomenclature of these dyestuffs refer to "Farbstofftabellen" by Gustav Schultz, Berlin, Weidmann'sche Buchhandlung.) Particularly good results are obtained with eosine dyestuffs.

The dyestuffs may be used either alone or in combination with other stabilizers. When using dyestuffs in combination with the usual stabilizers, as for instance salts, preferably alkaline salts, of lysalbinic acid and protalbinic acid, gum-arabic, tragacanth, etc., metal sols of such singularly high stability are obtained as cannot be produced by the exclusive use of stabilizers known hitherto. These sols, for example, even may be diluted with water without flocks being separated.

The transformation of the metals into the colloidal state and the stabilization of the sols may be effected by the usual methods known for this purpose, particularly in such a way that the colloidalization of the metals is carried on in the presence of the dyestuffs or of their water soluble salts. Hereby a very good and perfect dispersion is obtained, and the separation of coarser particles otherwise frequently necessary is avoided. This method is particularly recommendable, if sols are to be prepared which apart from the dyestuff do not contain any other stabilizer or only a stabilizer of low activity, as for example gum-arabic. However, if such or other usual stabilizers, as for instance sodium lysalbinate or protalbinate, are present, the dyestuffs may also be added later.

The possibility of using dyestuffs as stabilizers for metal sols while excluding other customary stabilizers is of particular importance if the stabilized sol is intended to be used for purposes in which the presence of the stabilizers hitherto employed is undesirable or might cause trouble. For instance, it is known that certain agents to be taken into consideration as catalyzers for metal sols, in particularly albumen decomposition products such as lysalbinates or protalbinates, in many cases have proved to be catalyzer poisons. Likewise it is known that the incorporation of such compounds into the blood circulation of humans or animals is frequently undesirable or even forbidden.

Further research has proved that the stabilizing power of the dyestuffs is not reduced if the metals are charged with other matter. That, for instance, the metals, particularly those belonging to the platinum group, may serve as carriers of hydrogen, gaseous hydrocarbons and other gases, or may be charged before, during or after the colloidalization and/or stabilization with various radiators, e. g. substances of natural or artificial radio-activity, in particular α-radiators, as radium emanation, actinium emanation, thorium X, polonium, actinium X, the latter for instance in the form of their salts. For the stabilization of metal sols charged with other matter dyestuffs may be used also either alone or in combination with other stabilizers.

Combinations of platinum and paladium, either uncharged or charged with other matter, with oxyfluorone dyestuffs or their water soluble salts, without or in presence of lysalbinates, have proved particularly valuable. Platinum and palladium sols which are charged with gases, e. g. hydrogen, and stabilized for instance with the aid or the additional agency or eosine dyestuffs, as eosine bluish for example, are suitable for catalytic reactions, while metal sols of similar nature which are charged, instead of hydrogen, with a radio-active agent, e. g. thorium X, render valuable services in the treatment of tumors such as cancers, of goitre, of blood diseases of certain etiology, of malformations, such as warts, of tuberculosis, of sleeping-sickness, and of several other diseases, on account of their destructive action on cells developing in the human or animal body in pathologically increased numbers and on protozoa.

Although the metal retains its metallic character in sols stabilized with dyestuffs, especially fluorone dyestuffs, chemical or chemophysical reactions apparently occur when the stabilizing is carried out with dyestuffs. Apart from other phenomena this appears from the fact that eosine, e. g. eosine bluish, when precipitated from an aqueous solution by hydrochloric acid yields a perfectly colorless filtrate while in the presence of e. g. platinum it passes through the filter with the platinum after being acidified. Gelatine after having been mixed with the platinum sol-eosine bluish-complex and allowed to solidify does not become liquid again spontaneously on warming, whereas gelatine to which either platinum sol only or dyestuff only has been added in analogous concentration becomes liquid again instantly when heated.

The stabilizing dyestuffs may further be used to vary the electric charge of the sols or to reverse their migration direction respectively, whereby it is irrelevant whether the metal of the sol is charged with other matter or no. Thus, for instance, by the addition of electropositive dyestuffs one may give an electrically positive charge to heavy metal sols, which generally are negative, and thereby reverse their direction in the electric field. If, for example, the electropositive eosine bluish is introduced into a platinum sol which is electro-negative in itself, the metal, at the cataphoresis, will flow with the dyestuff to the cathode. Thus, according to the invention, it is possible to manufacture electropositive preparations from electro-negative metal sols. For changing the electric charge of metal sols dyestuffs of the oxyfluorone group are particularly suitable. Also in this case the metals, e. g. platinum or palladium, may be charged for example with $\alpha$-radiators as thorium X or the like.

*Examples*

(1) 0.25 g. sodium protalbinate are dissolved in 15 cc. of water and then 1.5 g. of the potassium salt of tetrabromofluoresceine ethyl ester are added. To this solution are given 1 g. platinum hydrochloride, dissolved in 2 cc. of water, and thereupon 25 cc. of a 0.5% solution of hydrazine hydrate. The reduction of the platinum is indicated by a strong foaming. After standing for 48 hours the solution is cleaned by dialysis. The purified sol hereafter is dried by evaporation at a temperature appropriately not exceeding 30° C. The dry preparation dissolves again in water forming a colloidal solution of a color similar to concentrated potassium permanganate solutions.

(2) To a solution containing in 100 cc. 1 g. of platinum in the form of platinum hydrochloride and 8 g. of gum-arabic 10 g. of Eosine Bluish (E. Merck, Darmstadt) are added which dissolve readily in this mixture. Hereafter 25 cc. of a 0.5% solution of hydrazine hydrate are added. Then the mixture is brought to slightly alkaline reaction by a small quantity of concentrated soda lye and thoroughly shaken for some time. After 2 hours of standing the preparation is cautiously heated to 90–100° C. in a water bath for 3 hours, and allowed to cool down.

(3) The same reaction as under Example 1 is carried out with the modification that instead of platinum an equal quantity of chloride of gold is introduced, and the hydrazine hydrate is omitted, the reduction being effected by the sodium protalbinate itself. Consequently the mixture is only heated to the boiling point and then allowed to cool down slowly.

(4) The procedure is the same as described under Example 1 but palladious chloride is substituted for platinum hydrochloride and the reduction is effected by shaking with molecular hydrogen at a temperature of 50° C. instead of hydrazine hydrate.

(5) A solution of 0.5 g. platinum in the form of platinum hydrochloride in 100 cc. of water is mixed with 10 g. of the sodium salt of dinitrodibromofluoresceine. Then 25 cc. of a 0.5% solution of hydrazine hydrate and 16 cc. of a 2N soda lye are added. The mixture quickly darkens under foaming which is indicative of the reduction of the platinum hydrochloride. After 12 hours of standing it is heated up to 80° C. within 60 minutes and allowed to cool. The obtained sol is surprisingly stable.

(6) A solution of 0.5 g. platinum in the form of platinum hydrochloride in 50 cc. of distilled water is mixed with 100 cc. of a 4% solution of the bisulphite compound of coeruleine (coeruleine S) and neutralized by 2N soda lye. Then 20 cc. of a 0.5% solution of hydrazine hydrate are added which starts the development of foam. Hereafter further 5 cc. of 2N soda lye are added and after intensive shaking the mixture is allowed to stand over night and then heated for 10 minutes at 60° C.

(7) 1 g. sodium lysalbinate are dissolved in 30 cc. of water and a little more of sodium hydroxide than is needed for the neutralisation of 2 g. of platinum hydrochloride is added. A concentrated solution of 2 g. of platinum hydrochloride is brought into the slightly alkaline mixture, and then 10% more of hydrazine hydrate than required for reduction are added. The solution foams and thereupon an equal quantity of a 1% solution of a mixture of the sodium salts of eosine and methyleosine is added. After 24 hours of standing the preparation is filtered hot and allowed to cool. Hereafter hydrogen is passed through the mixture until saturation.

(8) 0.5 g. of platinum in the form of platinum hydrochloride are dissolved in 50 cc. of a 10% solution of gum-arabic and then mixed with an equal quantity of a 2% solution of the sodium salt of dinitrodibromofluoresceine. Hereafter the liquid is neutralised by a few drops of 2N soda lye, and 20 cc. of a 0.5% solution of hydrazine hydrate are added, whereupon the solution begins to foam. After adding 5 cc. of a 2N soda lye the mixture is thoroughly shaken, and after 12 hours standing it is heated to 50° C. for 10 minutes and filtered while still warm. After cooling 6 cc. of this preparation are mixed with 3 cc. of a commercial solution of a thorium X salt which is standardized to 1000 electrostatic units in 1 cc.

(9) 0.5 g. platinum in the form of platinum hydrochloride are dissloved in 100 cc. of water whereafter 10 g. of the sodium salt of dibromodinitrofluoresceine are added. Into this mixture are brought 25 cc. of a 0.5% hydrazine hydrate solution and thereupon 16 cc. of 2N soda lye. This preparation very quickly turns dark while foaming. After 12 hours standing the product is heated to 80° C. within 60 minutes and filtrated while hot. After cooling the solution is saturated with hydrogen.

(10) The same process as in Example 9 is carried out, but the sol is charged instead of hydrogen with a thorium X salt, as follows: 10 cc. of the preparation are mixed with 5 cc. of a commercial solution of a thorium X salt which contains 1000 electrostatic units in 1 cc.

(11) The same procedure as in Example 8 is followed but instead of the 10% gum-arabic solution a 4% solution of sodium protalbinate is added.

(12) 0.5 g. platinum in the form of platinum hydrochloride are dissolved in 100 cc. of a 10% gum-arabic solution, then 100 cc. of a 3% solution of the ethylester of diethylrhodamine (rhodamine 6G), further 20 cc. of a 0.5% hydrazine hydrate solution, and lastly 12 cc. of a 2N soda lye are added. After standing over night the preparation is heated in the course of 1 hour to 60° C., filtered and allowed to cool.

(13) A platinum sol, prepared in the usual way with the aid of sodium lysalbinate, containing 5% platinum, is found to be unchanged after several months when an equal quantity of a 1% solution of the sodium salt of dibromodinitrofluoresceine has been added, whereas flocks are separated after 3–4 weeks if the same platinum sol is diluted with an equal quantity of distilled water.

(14) The same reaction as under 13 is shown by a platinum sol which instead of the dyestuff mentioned contains 2g. of the potassium salt of tetrabromofluoresceine ethyl ester.

(15) A platinum sol with 1% platinum which in addition to sodium lysalbinate contains 1% of the sodium salt of tetraiodofluoresceine (erythrosine) in the total quantity of fluid, keeps stable even after boiling and after dilution, whereas in the absence of the dyestuff far-reaching separation of flocks takes place under these conditions.

(16) A 0.5% silver sol does not show sufficient stability unless about 1% eosine bluish is present in the solution.

(17) A sol which contains 2.5 g. platinum and 10 g. of the alkali salt of tetraiododichlorofluoresceine (rose bengal) in 200 cc. of a 10% gum-arabic solution is distinguished by high stability, whereas in the absence of the dyestuff separation of flocks commences already after a few days.

(18) Flocculations are to be observed in a 1% palladium sol after some weeks. However, if 4% of the sodium salt of tetraiodofluoresceine are present in the solution such flocculations do not occur even within double that time.

(19) 1 cc. of a 5% platinum sol containing sodium protalbinate as stabilizer is shaken with 0.5 cc. of an aqueous solution of thorium X chloride equal to 500 E. S. units whereupon 2 cc. of a 10% aqueous solution of eosine bluish (E. Merck, Darmstadt) are added under stirring.

(20) 2 cc. of a 5% platinum sol which contains sodium lysalbinate as stabilizer, are mixed with 4 cc. of a 10% aqueous solution of eosine bluish, whereupon 1500 E. S. units of thorium X in form of its nitrate in 1.5 cc. water are added. The colloidal solution then is thoroughly mixed and allowed to stand.

(21) 1.5 cc. of a palladium sol, stabilized for example by gum-arabic are added under stirring to a mixture of 2 cc. of a 5% solution of fluoresceine and 1 cc. of an aqueous solution of radium emanation containing 1000 E. S. units.

(22) A platinum sol is prepared by reduction of a 1% solution of platinum hydrochloride containing about 10% by weight of eosine bluish, without employing any additional stabilizer, after the usual method, for example by adding an alkaline solution of hydrazine hydrate. 5 cc. of this sol are mixed under stirring with 1500 E. S. units of polonium or thorium X.

Various changes may be made in the details disclosed in the foregoing specification without departing from the invention or sacrificing the advantages thereof.

In the claims affixed to this specification no selection of any particular modification of the invention is intended to the exclusion of other modifications thereof, and the right to subsequently make claim to any modification not covered by these claims is expressly reserved.

We claim:

1. Stabilized metal sol comprising colloidal heavy metals and xanthone dyestuffs.

2. Stabilized metal sol comprising colloidal heavy metals and oxyfluorone dyestuffs.

3. Stabilized metal sol comprising a colloidal metal of the platinum group and an eosine dyestuff.

4. Stabilized metal sol comprising a colloidal metal of the platinum group, a stabilizing albumen decomposition product and a stabilizer of the xanthone dyestuff group.

5. Stabilized metal sol comprising a colloidal metal of the platinum group, a stabilizer selected from a group consisting of alkaline salts of lysalbinic acid and protalbinic acid and an oxyfluorone dyestuff.

6. Stabilized metal sol comprising a colloidal metal of the platinum group, gum-arabic and an oxyfluorone dyestuff.

7. Stabilized metal sol comprising a colloidal heavy metal selected from a group consisting of platinum and palladium and an alkaline salt of dinitrodibromofluoresceine.

8. Stabilized metal sol comprising a colloidal heavy metal selected from a group consisting of platinum and palladium, a stabilizer selected from a group consisting of alkaline salts of lysalbinic acid and protalbinic acid, and an alkaline salt of dinitrodibromofluoresceine.

9. Stabilized metal sol comprising a colloidal heavy metal charged with adsorbed matter and a stabilizing xanthone dyestuff.

10. Stabilized metal sol comprising a colloidal heavy metal charged with hydrogen and a stabilizing xanthone dyestuff.

11. Stabilized metal sol comprising a colloidal heavy metal charged with radiators and a stabilizing xanthone dyestuff.

12. Stabilized metal sol comprising a colloidal metal of the platinum group charged with a radio-active α-radiator and an oxyfluorone dyestuff.

13. Stabilized metal sol comprising a coloidal metal of the platinum group charged with thorium X and an oxyfluorone dyestuff.

14. Stabilized metal sol comprising a colloidal metal of the platinum group charged with a radiator and an eosine dyestuff.

15. Stabilized metal sol comprising a colloidal metal of the platinum group charged with a radiator, a stabilizer selected from a group consisting of the alkaline salts of the lysalbinic acid and protalbinic acid and a dyestuff from the xanthone group.

16. Stabilized metal sol comprising a colloidal metal of the platinum group charged with a radiator, gum-arabic and a dyestuff of the xanthone group.

17. Stabilized metal sol comprising a colloidal metal selected from a group consisting of platinum and palladium charged with a radiator, and an alkaline salt of dinitrodibromofluoresceine.

18. Stabilized metal sol comprising a colloidal metal selected from a group consisting of platinum and palladium charged with a radiator, a protective colloid and an alkaline salt of dinitrodibromofluoresceine.

19. Stabilized metal sol comprising a colloidal metal selected from a group consisting of platinum and palladium charged with thorium X, a stabilizer selected from a group consisting of alkaline salts of lysalbinic acid and protalbinic acid, gum-arabic, and tragacanth, and an eosine dyestuff.

20. Method of preparing stabilized heavy metal sols consisting in subjecting the metal to be stabilized to colloidalization in the presence of a stabilizing xanthone dyestuff.

21. Method of preparing stabilized heavy metal sols consisting in subjecting the metal to be stabilized to colloidalization and introducing at least one stabilizing xanthone dyestuff into the system.

22. Stabilized metal sol comprising a colloidal heavy metal, a protective colloid and a xanthone dyestuff.

PAUL TROCH.
HERMANN VOSS.
ERICH RABALD.
HERI GEIGEL.